United States Patent [19]

Taylor, Jr.

[11] Patent Number: 4,858,732
[45] Date of Patent: Aug. 22, 1989

[54] BRAKE SHOE

[76] Inventor: James L. Taylor, Jr., 1611 S. Renaud, Grosse Pointe Woods, Mich. 48236

[21] Appl. No.: 946,116

[22] Filed: Dec. 23, 1986

Related U.S. Application Data

[63] Continuation of Ser. No. 678,257, Dec. 5, 1984, abandoned, which is a continuation-in-part of Ser. No. 430,323, Sep. 30, 1982, abandoned.

[51] Int. Cl.$^4$ ............................................. F16D 69/04
[52] U.S. Cl. ............................. 188/250 G; 192/107 T; 411/3
[58] Field of Search ............... 188/234, 235, 236, 237, 188/238, 239, 240, 241, 250 A, 250 G; 192/70.13, 107 T; 411/2, 3

[56] References Cited

U.S. PATENT DOCUMENTS

| | | |
|---|---|---|
| 1,711,602 | 5/1929 | Kindler . |
| 1,729,140 | 9/1929 | Thompson . |
| 1,757,273 | 5/1930 | Thompson . |
| 1,771,595 | 7/1930 | Thompson . |
| 1,857,124 | 5/1932 | Brackett . |
| 1,930,779 | 10/1933 | Snell . |
| 1,934,448 | 11/1933 | Roth . |
| 2,013,948 | 9/1935 | Carew . |
| 2,016,280 | 10/1935 | Gatke . |
| 2,027,822 | 1/1936 | Hoffman . |
| 2,037,109 | 4/1936 | Berry et al. . |
| 2,067,086 | 1/1937 | Hoffman . |
| 2,081,588 | 5/1937 | LaBrie . |
| 2,100,174 | 11/1937 | Ruffino . |
| 2,109,871 | 3/1938 | Thode . |
| 2,164,015 | 6/1939 | Kateley . |
| 2,291,525 | 7/1942 | Bessey . |
| 2,476,588 | 7/1949 | Dreher . |
| 2,630,889 | 3/1953 | Lewis . |
| 2,656,020 | 10/1953 | McCune . |
| 2,708,010 | 5/1955 | Wolf ........................... 192/107 T X |
| 2,784,824 | 3/1957 | Hanslip . |
| 2,791,299 | 5/1957 | Bonkowski . |
| 2,791,300 | 5/1957 | Bonkowski . |
| 2,866,886 | 12/1958 | Koehring . |
| 2,879,866 | 3/1959 | Newell . |
| 2,892,226 | 6/1959 | Bradney . |
| 2,948,360 | 8/1960 | Lupton . |
| 3,647,033 | 3/1972 | Klein . |
| 4,108,699 | 8/1978 | de Gennes . |

FOREIGN PATENT DOCUMENTS

| | | |
|---|---|---|
| 613540 | 1/1961 | Canada . |
| 2125899 | 1/1972 | Fed. Rep. of Germany . |
| 2353751 | 7/1975 | Fed. Rep. of Germany . |
| 1474750 | 5/1968 | France . |
| 307722 | 5/1933 | Italy .................... 188/234 |

OTHER PUBLICATIONS

"Brake Dynamics-A Introduction to Vehicle Brake Testing at the Inspection Station Level" by Andrew J. White (1963).

"Midwest Brake Bond Co.-Everybody Can Have Bonded Brakes"-brochure.

Primary Examiner—George E. A. Halvosa
Attorney, Agent, or Firm—Harness, Dickey, Pierce

[57] ABSTRACT

A brake shoe for a drum brake assembly such as those used in bus and truck applications comprising a brake pad assembly having at least one pad element having a continuous external surface, a mechanism for positioning the pad element relative to the brake drum of the drum brake assembly, and a mechanism for securing the brake pad assembly to the positioning mechanism, the securing mechanism including an alignment mechanism to align the brake pad assembly and thereby the brake pad to the positioning assembly. An alternate embodiment of the securing mechanism includes a failure element that enables the forces utilized for securing the brake pad assembly to the positioning assembly to be automatically controlled and prohibits tampering with the resulting assembly.

11 Claims, 2 Drawing Sheets

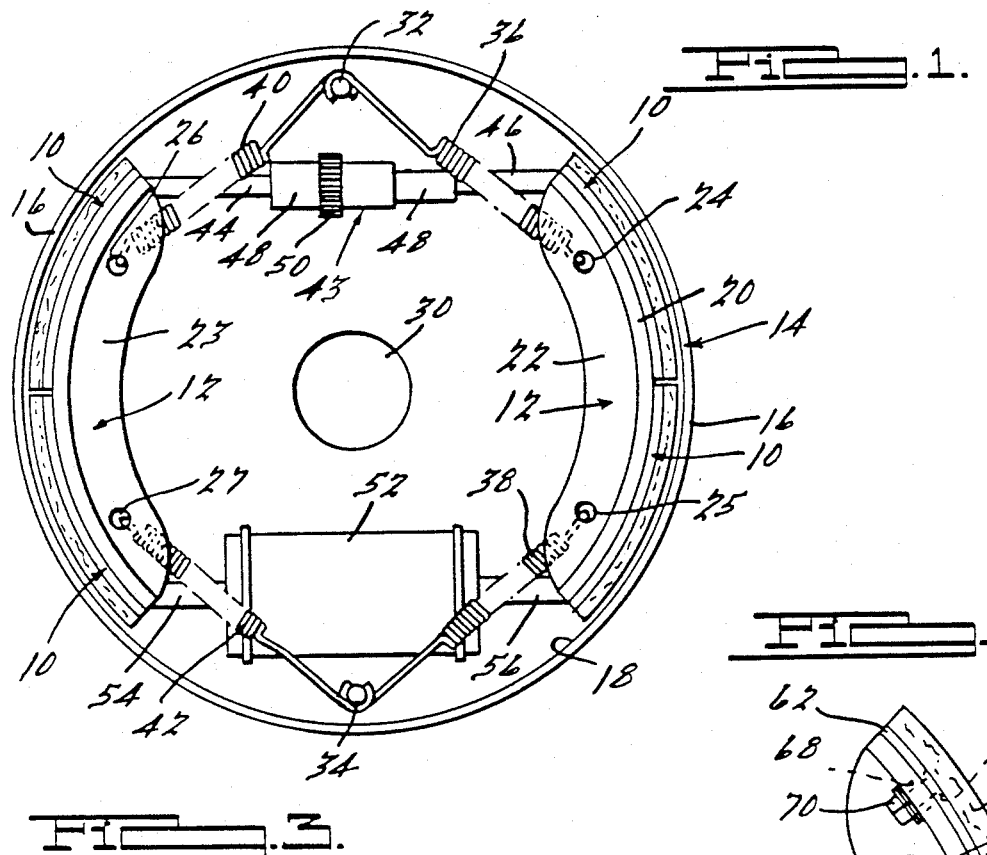

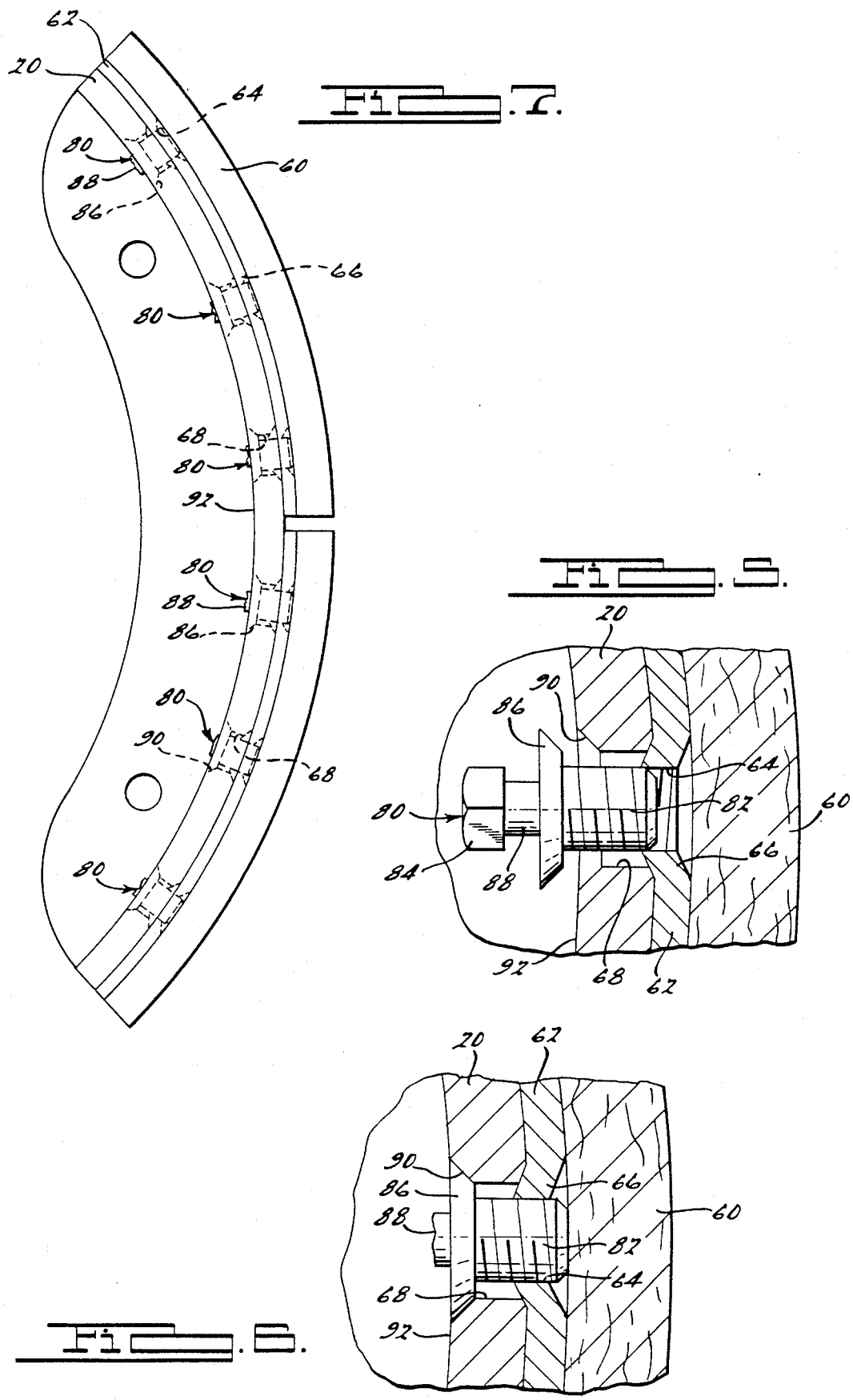

BRAKE SHOE

CROSS REFERENCE TO RELATED APPLICATION

This continuation U.S. patent application Ser. No. 678,257, filed Dec. 5, 1984 entitled "Brake Shoe" which is a continuation in part of application U.S. patent application Ser. No. 430,323, filed Sept. 30, 1982, both now abandoned.

BACKGROUND AND SUMMARY OF THE INVENTION

The present invention relates generally to brake assemblies for automotive vehicles. More particularly, the invention relates to brake pad assemblies for drum brakes and to an improved brake shoe assembly for drum brakes such as those used on buses and trucks.

In the past, brake shoes for buses and trucks had to be removed from the bus or truck and rebonded with an asbestos material or similar material in order to repair or replace a used brake pad. The entire brake shoe had to be removed from the brake assembly and sent to a bonding facility for repair. An inventory of entire brake shoes had to be maintained by a repair facility in order to keep buses and/or trucks in service. The brake shoes for the buses and trucks are relatively heavy parts and inventories of these large, heavy parts are fairly expensive to maintain due to the cost of the extra parts themselves, the space needed to inventory the parts, and the curbersome nature of the entire brake shoe.

One embodiment of the present invention includes a practical and replaceable brake pad for the brake shoes of buses or trucks. The replaceable brake pad eliminates the need to have a substantial inventory of actual brake shoes and permits a repair facility to have a such lighter weight, less cumbersome, less expensive inventory of merely the pad element of the shoes alone, which pad elements also take up much less space than an inventory of the entire brake shoes.

This embodiment of the present invention may also permit multiple types of brake pads on the same shoes. Different friction characteristics of pads may be desirable on buses or similar vehicles to reduce noise and equalize wear on brake pads. It is commonly known to use medium friction blocks on reverse shoes and low friction blocks on forward shoes in each brake of a bus or to use medium friction blocks on front axial shoes and low friction blocks on rear axial shoes to balance the braking effort of bus. With this embodiment of the present invention, upper and lower friction blocks on the same shoe may be altered to further vary friction characteristics to modify noise or braking effort as desired by a particular installation on a bus or truck. The above objects are all provided in one device that is easy to manufacture, less costly to manufacture and also less costly to buy and less costly to inventory.

Another embodiment of the present invention includes an improved brake shoe assembly having fastening means for attaching the brake pad assembly to the brake shoe that enables the fastening force to be set and controlled automatically for properly securing the brake pad assembly to the brake shoe. The fastening means further provides both an audio and a visual indication when a predetermined level of fastening force has been reached so that the pad assembly can be secured to the brake shoe without over-tightening or under-tightening the assembly and its constituent parts.

Additional objects and advantages of the present invention will be seen in the following claims, description of the drawings and additional specification.

BRIEF DESCRIPTION OF THE DRAWINGS

FIG. 1 is an elevated side view of a brake pad of one embodiment of the present invention in an environment typical of its use;

FIG. 2 is an elevated side view of the one brake shoe of FIG. 1;

FIG. 3 is an elevated view of the brake shoe and brake pad of FIG. 2;

FIG. 4 is an enlarged side sectional view of the assembly of FIG. 2;

FIG. 5 is an enlarged side sectional view similar 4 and illustrating the partial assembly of another embodiment of a brake shoe and brake pad of the present invention;

FIG. 6 is an enlarged side sectional view of the embodiment of FIG. 5 in a fully assembled condition; and FIG. 7 is an elevated side view of the brake shoe and brake pad of FIG. 5.

DETAILED DESCRIPTION OF THE PREFERRED EMBODIMENTS

Referring to FIG. 1, the brake pad 10 of one embodiment of the present invention is illustrated with two brake pads 10 on each of two shoes 12 in the environment of a brake assembly 14. The brake assembly 14 comprises an outer brake drum 16 within which the two brake shoes 12 are located with the brake pads 10 extending toward the inner surface 18 of the drum 16. The shoe 12 comprises a table 20 to obtain proper positioning of the pad 10 and two web portions 22 and 23 welded to the table 20 to form a "C" shape cross-section. Each of the webs 22 and 23 have two apertures (24 and 25 on web 22, 26 and 27 on web 23). A bar 28 extends from web 22 to web 23 and is disposed in two of the apertures, one in each web. The brake drum 16, as situated on the axle of the vehicle 30, includes pins 32 and 34 on opposite sides of the axle 30. Springs 36, 38, 40 and 42 extend from the bars 28 on the brake shoes 12 to the respective pin 32 or 34. The springs 36, 38, 40 and 42 are all tension springs biasing the brake shoes 12 away from the brake drum 16.

At one end of the brake shoes 12, an adjustment assembly 43 maintains a distance between the brake shoes 12. The assembly 43 comprises dowel members 44 and 46 which abut the table 20 of the brake shoes 12 between the webs 22 and 23 of the respective shoes. The dowel members 44 and 46 are externally threaded on one end to rate with an internally threaded collar 48 having a rotatable gear adjustment mechanism 50 to affect rotation of the collar 48 either manually or otherwise. At the opposite end of the shoes 12 is a conventional hydraulic cylinder 52 which has rods 54 and 56 extending therefrom which, upon actuation of the cylinder 52 by a brake pedal or the like, will force the rods 54 and 56 toward the drum 16 and push the shoes 12 toward the drum 16 in order to provide contact of the brake pad 10 with the inner surface 18 of the brake drum 16. All of the internal brake actuation assembly, including the adjustment assembly 43, the hydraulic brake actuation mechanism 52, and the springs 36, 38, 40 and 42 can be replaced by any conventional working mechanism that is adaptable to the brake shoes and brake drum illustrated and described herein.

Referring to FIG. 2, an enlarged view of the brake pad 10 and brake shoe 12 of the present invention is shown. Each brake pad 10 comprises a pad element 60 integrally bonded to a liner 62. The liner 62 has a plurality of stamped and threaded hole throughout the liner which are capable of being threadably associated with a proper bolt. The stampings also create an internally extending raised portion 66 at each of the holes 64. The brake shoe 12 in turn has a of corresponding holes 68 along and through the table 20 thereof. The holes 68 are larger in diameter than the width of the raised portion 66 of the liner 62 to act as a seat for a corresponding raised portion 66.

Thus, the brake pad 10 is associateable with the shoe 12 by placement of the pad 10 upon the table 20 of the shoe 12.and seating the extended portions 66 around the staamped holes 64 of the liner 62 into the holes 68 of the table 20. A corresponding number of holes 64 and 68 exist in corresponding positions on the liner 62 and table 20, although a greater number of holes 68 may exist in the table 20 with no effect on the position of the brake pad 10 (or liner 62). Thus, the brake shoe table 20 may have hole 68 for locating more than one type of brake pad 10.

A bolt 70, having a lock washer 72, is then inserted through the hole 68 of the table 20 and threadably received into the hole 64 of the pad 10. The bolt 70 is of a length that reaches through the hole 64 of the pad 10 but either does not contact or merely comes adjacent to the pad element 60 of the brake pad 10. Thus, the pad element 60 can be continuous throughout the extent of the brake pad 10 and not have any countersunk holes or similar discontinuities as required in the art at the present time for similar constructions. Furthermore, the pads 10 are removable and replaceable merely by removal of the bolts, and replacement and reattachment of a new pad 10. The used pad 10, having a sturdy metal liner 62, may be recycled by bonding on a new asbestos or other wear-resistant surface.

As illustrated in FIGS. 1, 2 and 3, more than one pad 10 may be secured to a brake shoe 12. Thus, different wear characteristics may be provided on the same brake shoe 12 depending upon which pad is the forwardmost on the shoe 12 in the forward direction of wheel movement or other considerations that may make different wear characteristics desirable. Pads having the same or at least substantially the same wear characteristics are, however, presently preferred on the same brake shoe.

Another embodiment of the present invention is illustrated in FIGS. 5 through 7. This embodiment of the invention includes a plurality of torque limiting bolts 80 operative to be passed through table holes 68 of table 20 and through the raised portions 66 of threaded hole 64 in liner 62 to secure the liner 62 and the pad element 60 bonded thereto to table 20. Each of the bolts 80 includes a threaded portion 82 at one of its axial ends and a head portion 84 at its opposite axial end. Each bolt 80 is further formed with a radially outwardly extending clamping portion 86 disposed axially between head portion 84 and threaded portion 82 and a reduced diameter shank portion 88 extending axially between clamping portion 86 and head portion 84. As shown most readily in FIGS. 5 and 6, each clamping portion 86 is formed to be matingly received within a countersunk portion 90 of an associated table hole 68 as each bolt 80 is threaded into its associated hole 64 in liner 62. FIG. 5 illustrates a typical bolt 80 as it is being passed through a table hole 68 into hole 64. FIG. 6 illustrates a bolt 80 which has been fully threadably assembled through table 20 into a corresponding hole 64 in liner 62. This threading operation is accomplished by applying a torque imparting tool to head portion 84 to turn the bolt 80 into hole 64 until clamping portion 86 is received within countersunk portion 90 of hole 68 and into engagement with table 20. When such engagement of clamping portion 86 with countersunk portion 90 is effected, further use of the torque imparting tool will yield a threaded assembly of liner 62 with table 20. Cn the other hand, shank portion 88 is operative to define the weakest torsional point of the bolt 80 and will fail when a predetermined threshold level of torque is imparted to the bolt 80, effecting a disengagement of head portion 84 from the remaining portions of the bolt 80. A resulting assembly of liner 62 and pad element 60 with the table 20 utilizing a series of such bolts 80 is shown in FIG. 7. As shown in FIG. 6, the failure of shank 88 is such that bolt 80 is prohibited from traversing any portion of the friction pad element 60.

As is readily apparent, the embodiment of the present invention illustrated in FIGS. 5 through 7 yields the previously-described advantages of the invention, as well as the further feature of control over the fastening forces applied to the resulting assembly of liner 62 and pad element 60 with table 20. More particularly, the combination of table 20 and liner 62 with bolts 80 provides this embodiment of the invention with enhanced safety and quality control features since it enables an assembly of the respective elements to be achieved without over-tightening or under-tightening of the elements. The further advantage of this embodiment stems from the fact that the bolts 80 provide the worker assembling this embodiment with both a visual and audio signal or indication that the desired threshold level of torque imparted to the assembly has been achieved. The design of this embodiment further yields the additional advantage of effectively providing a tamper-proof feature to the assembly once the associated head portions 84 of each bolt 80 have been sheared from the remaining portions of the bolt 80.

Thus, there are disclosed in the above description and in the drawings illustrative embodiments of the invention which fully and effectively accomplishes the objects thereof. However, it will be apparent that variations in the details of the apparatus may be indulged in without departing from the sphere of the invention herein described, or the scope of the appended claims.

What is claimed is:

1. In a drum brake assembly comprising a brake drum, a brake shoe and means for engaging and disengaging said brake shoe with said brake drum, a brake shoe comprising:

a brake pad subassembly including at least one arcuate liner having a plurality of threaded liner holes therein at various locations through said arcuate liner and a friction pad element fixed to said liner and continuously covering one surface of said liner;

means for positioning said brake pad subassembly relative to said brake drum comprising a table having surfaces on opposed sides thereof, web means fixedly secured to said table on one of said opposed surfaces of said table, and a plurality of table holes extending through said table from said one opposed surface to said other opposed surface, said table holes corresponding in position to the position of said liner holes when said brake pad subassembly is operably associated with said positioning means;

means for securing said brake pad subassembly to said positioning means comprising a plurality of bolts extending through at least some of said table holes into engagement with corresponding liner holes in said liner of said brake pad subassembly without traversing any portion of said friction pad element, said table holes having a size larger than said bolt diameter such that peripheral gaps are between said bolts and said table holes to enable alignment of said bolts with said threaded liner holes, said bolts having a retainer positioned around said bolts for limiting the insertion of said bolt into said liner holes, said bolts including torque limiting means for limiting the maximum amount of torque to which said bolts can be subjected without said bolts traversing any portion of said friction pad element when said liner-and-pad subassembly is secured to said brake shoe table; and means for aligning said brake pad subassembly with said positioning means comprising raised portion of said liner generally surrounding said liner holes and extending away from said friction pad element, said raised portions being insertable into said table holes in a seating relationship therewith to align and rotationally interconnect said brake pad subassembly with said positioning means for securing said brake subassembly to said positioning means.

2. A brake shoe assembly for a brake having a brake drum, said brake shoe assembly comprising at least one friction pad element having a substantially continuous external friction surface, a liner member fixedly secured to said friction pad element to form a liner-and-pad subassembly, a brake shoe table connectable to the brake for movement toward and away from said brake drum and securing means for securing said link-and-pad subassembly to said brake shoe table, said securing means including a threaded liner aperture extending through said liner member, a table aperture extending through said brake shoe table, and a threaded fastener receivable in said table aperture and threadably engageable with said threaded liner member without traversing any portion of said friction pad element, said table apertures having a size larger than said threaded fastener diameter such that a peripheral gap is between said threaded fastener and said table aperture for alignment of said threaded fastener with said threaded liner aperture, said threaded fasteners having a retainer positioned around said threaded fasteners for limiting the insertion of said threaded fasteners into said liner apertures, said threaded fasteners including torque limiting means for limiting the maximum amount of torque to which said threaded fasteners can be subjected without said threaded fasteners traversing any portion of said friction pad element when said liner-and-pad subassembly is secured to said brake shoe table, sad liner member having an annular raised portion generally surrounding said threaded liner aperture and protruding into said table aperture in a seating engagement therewith for aligning said liner-and-pad subassembly with said brake shoe table when secured thereto.

3. A brake shoe assembly according to claim 2, wherein said securing means includes a plurality of table apertures extending through said brake shoe table and a plurality of said threaded fasteners for securing more than one liner-and-pad subassembly to said brake shoe table.

4. A shoe assembly according to claim 3, wherein at least two of said liner-and-pad subassemblies have friction pad elements with different friction characteristics.

5. A brake shoe assembly according to claim 3, wherein at least two of said liner-and-pad subassemblies have wear pad elements with different wear characteristics.

6. A brake shoe assembly according to claim 3, wherein all of said liner-and-pad subassemblies have friction pad elements with substantially identical friction characteristics.

7. A brake shoe assembly according to claim 3, wherein all of said liner-and-pad subassemblies have wear pad elements substantially identical wear characteristics.

8. A brake shoe assembly according to claim 3, wherein said torque limiting means includes a tool-engaging portion of said threaded fastener operative to fail when said threaded fastener is subjected to a torque greater than said maximum amount of torque.

9. A brake shoe assembly according to claim 8, said threaded fastener includes a clamping portion for clampingly engaging said brake shoe table and for seatingly protruding into said table aperture when said liner-and-pad subassembly is secured to said brake shoe table, said torque limiting means being disposed on the opposite side of said clamping portion from said brake shoe table when said liner-and-pad subassembly is secured to said brake shoe table.

10. A brake shoe assembly according to claim 9, wherein said clamping portion is frustoconical in shape and said table aperture includes a frustoconical countersunk portion for seatingly engaging said frustoconical clamping portion of said threaded fastener.

11. In a drum brake assembly comprising a brake drum, a brake shoe and means for engaging and disengaging said brake shoe with said brake drum, a brake shoe comprising:

a brake pad subassembly including at least one arcuate linear having a plurality of threaded liner holes therein at various locations through said arcuate liner and a friction pad element fixed to said liner and continuously covering one surface of said liner;

means for positioning said brake pad subassembly relative to said brake drum comprising a table having surfaces on opposed sides thereof, web means fixedly secured to said table on one of said opposed surfaces of said table, and a plurality of table holes extending through said table from said one opposed surface to said other opposed surface for enabling multiple types of brake pad subassemblies to be positioned on said table, at least some of said table holes corresponding in position to the position of liner holes of said multiple types of brake pad subassemblies when said brake pad subassembly is operably associated with said positioning means;

means for securing said brake pad subassembly to said positioning means comprising a plurality of bolts extending through at least some of said table holes into engagement with corresponding linear holes in said liner of said multiple type brake pad subassemblies without traversing any portion of said friction pad element, said table holes having a size larger than said bolt diameter such that peripheral gaps are between said bolts and said table holes to enable alignment of said bolts with said threaded liner holes in said liners of said multiple brake pad subassemblies, said bolts having a retainer positioned around said bolts for limiting the insertion of said bolt into said liner holes, said bolts including torque limiting means for limiting the maximum amount of torque to which said bolts can be subjected without said bolts traversing any portion of said friction pad element when said liner-and-pad subassembly is secured to said brake shoe table; and means for aligning said brake pad subassembly with said positioning means comprising raised portions of said liner generally surrounding said liner holes and extending away from said friction pad element, said raised portions being insertable into said table holes in a seating relationship therewith to align and rotationally interconnect said brake pad subassembly with said positioning means for securing said brake subassembly to said positioning means.

* * * * *

UNITED STATES PATENT AND TRADEMARK OFFICE
CERTIFICATE OF CORRECTION

PATENT NO. : 4,858,732

DATED : August 22, 1989

INVENTOR(S) : James L. Taylor, Jr.

It is certified that error appears in the above-identified patent and that said Letters Patent is hereby corrected as shown below:

Col. 1, Line 37, "such" should be -- much --

Col. 1, Line 51, after "of" (1st occurrence) insert -- a --.

Col. 2, Line 17, after "similar" insert -- to Figure --

Col. 2, Line 53, "rate" should be -- mate --

Col. 3, Line 5, "hole" should be -- holes 64 --

Col. 3, Line 9, after "a" insert -- series --

Col. 3, Line 17, "staamped" should be -- stamped --

Col. 3, Line 23, "hole" should be -- holes --

Col. 3, Line 53, "hole" should be -- holes --

Col. 4, Line 4, "torgue" should be -- torque --

Col. 4, Line 10, "Cn" should be -- On --

Col. 5, Line 36, Claim 2, "link-and-pad" should be -- liner-and-pad --

UNITED STATES PATENT AND TRADEMARK OFFICE
CERTIFICATE OF CORRECTION

PATENT NO. : 4,858,732

DATED : August 22, 1989

INVENTOR(S) : James L. Taylor, Jr.

It is certified that error appears in the above-identified patent and that said Letters Patent is hereby corrected as shown below:

Col. 5, Line 56 Claim 2,
"sad" (2nd occurrence) should be -- said --

Col. 6, Line 14, Claim 7,
insert "with" before -- substantially --

Col. 6, Line 16, Claim 8,
"3" should be -- 2 --

Col. 6, Line 21, Claim 9,
insert "wherein" after -- 8 --

Col. 6, Line 40, Claim 11,
"linear" should be -- liner --

Signed and Sealed this

Fifth Day of March, 1991

*Attest:*

HARRY F. MANBECK, JR.

*Attesting Officer*          *Commissioner of Patents and Trademarks*